United States Patent [19]

Trimbo et al.

[11] Patent Number: 5,670,157
[45] Date of Patent: Sep. 23, 1997

[54] METHOD FOR REDUCING AND CONTROLLING IMMUNOGLOBULIN CONCENTRATIONS

[75] Inventors: Susan Trimbo, Evanston; David Madsen, Libertyville; W. Bruce Rowe, Evanston, all of Ill.

[73] Assignee: Nestec Ltd., Vevey, Switzerland

[21] Appl. No.: 570,098

[22] Filed: Dec. 11, 1995

[51] Int. Cl.⁶ .......................... A61K 45/00; A61K 45/05; A61K 47/00; A01N 37/18

[52] U.S. Cl. ...................... 424/278.1; 424/283.1; 424/439; 514/2; 514/12; 514/23

[58] Field of Search ............................ 424/278.1, 283.1, 424/439; 514/2, 12, 23

[56] References Cited

PUBLICATIONS

Sears et al, *Relation Between Airway Responsiveness and Serum IgE in Children With Asthma and in Apparently Normal Children*, The New england Journal of Medicine, vol. 325, No. 15, pp. 1067–1071 (1991).

*Primary Examiner*—Christina Y. Chan
*Assistant Examiner*—Patrick J. Nolan
*Attorney, Agent, or Firm*—Hill, Steadman & Simpson

[57] ABSTRACT

The present invention provides a method for reducing and controlling antigen-specific immunoglobulin concentrations in a patient. In addition, the present invention provides a method for maintaining physiological functions of the intestine in a patient. Pursuant to the present invention, the composition includes a protein source, a carbohydrate source, a fat source, and a specialized vitamin and mineral profile.

18 Claims, 2 Drawing Sheets

Daily Food Consumption

METHOD FOR REDUCING AND CONTROLLING IMMUNOGLOBULIN CONCENTRATIONS

BACKGROUND OF THE INVENTION

The present invention relates generally to the treatment and nutritional support of patients. More specifically, the present invention relates to treatments designed to reduce or control immunoglobulin concentrations in a patient.

Patients challenged with metabolic stress and injury have a significant need for increased nutrients and energy. For instance, gastrointestinal disorders, such as inflammatory bowel diseases, and trauma are associated with loss of the body's nutrient stores. Non-essential nutrients and substances that a body typically can synthesize in adequate supply may become limiting. Additionally, absorption of nutrients from the gut can become compromised.

Patients suffering from a loss of nutrients require adequate nutritional support. A lack of adequate nutritional support can result in malnutrition associated complications, such as prolonged negative nitrogen balance and depletion of somatic and visceral protein levels. Thus, the goal of nutritional support is to maintain body mass, provide nitrogen and energy in adequate amounts to support healing, meet metabolic demands characterized by the degree of stress, and support immune function.

Effective nutritional support of individuals in clinical settings affects the course of disease processes. Diseases of the gastrointestinal tract are of particular concern because the impairment of mucosal barrier functions, in combination with poor assimilation of food, can lead to systemic and local sequela. Inflammation of the intestine impairs physiological and immunological functions.

Researchers have constantly struggled to formulate nutritional products to adequately treat patients suffering from intestinal inflammation. However, little research has addressed the effect of a patient's diet on the recovery process following intestinal inflammation.

SUMMARY OF THE INVENTION

The present invention provides a method for reducing immunoglobulin concentrations (i.e. IgE and IgM) in a patient. Likewise, the present invention provides a method for controlling immunoglobulin concentrations in a patient. Still further, the present invention provides a method for maintaining the physiological functions of a patient's intestine.

In an embodiment, the present invention provides a method for reducing antigen-specific immunoglobulin concentrations in a patient. The method includes a step of administering to the patient a therapeutically effective amount of a clinical composition.

Pursuant to the present invention, the composition includes: a protein source comprising approximately 10% to 30% of the total calories; a carbohydrate source comprising approximately 25% to 60% of the total calories; and a lipid source comprising approximately 15% to 45% of the total calories. Preferably, the composition also includes a source of vitamins and minerals including approximately 75% to about 250% of the United States Recommended Daily Allowance per 1500 Kcal of composition administered.

A suitable protein source that may be used in the present invention can be intact or hydrolyzed protein. In an embodiment, the protein source may be whey protein, soy protein, casein or mixtures thereof.

In an embodiment, the carbohydrate source is either maltodextrin, corn starch, sucrose or mixtures thereof.

In another embodiment, the composition includes a lipid source having both a source of medium-chain triglycerides and a source of long-chain triglycerides. In an embodiment, the lipid source includes approximately 20% to 80% medium-chain triglycerides.

The present invention also provides a method for controlling antigen-specific immunoglobulin concentrations in a patient. The method includes the step of administering to the patient a therapeutically effective amount of the composition comprising: a protein source; a carbohydrate source; a fat source; and a source of vitamins and minerals. The protein source comprises approximately 10% to 30% of the total calories. The carbohydrate source comprises approximately 25% to 60% of the total calories. And, the fat source comprises approximately 15% to 45% of the total calories.

Still further, the present invention provides a method for maintaining physiological functions of the intestine in a patient. The method includes the step of administering to the patient a therapeutically effective amount of the composition of the present invention.

An advantage of the present invention is that it provides a new method for selectively reducing certain immunoglobulin concentrations in a patient. In this regard, the present invention provides a method for reducing IgE and IgM concentrations in a patient.

Moreover, an advantage of the present invention is that it provides a new method for selectively controlling immunoglobulin concentrations in a patient.

Another advantage of the present invention is that the reduction of immunoglobulin concentrations may promote the treatment of patients suffering from gastrointestinal inflammation. For instance, the present invention may have therapeutical implications in the treatment of inflammatory bowel diseases, trauma, food allergies and related insults.

Still further, an advantage of the present invention is that it provides a method for maintaining the nutritional status of the patient while also maintaining the intestinal physiological functions and reducing IgE and IgM levels of the patient.

Additional features and advantages of the present invention are described in, and will be apparent from, the detailed description of the presently preferred embodiments and from drawings.

DETAILED DESCRIPTION OF THE PRESENTLY PREFERRED EMBODIMENTS

Figure 1:
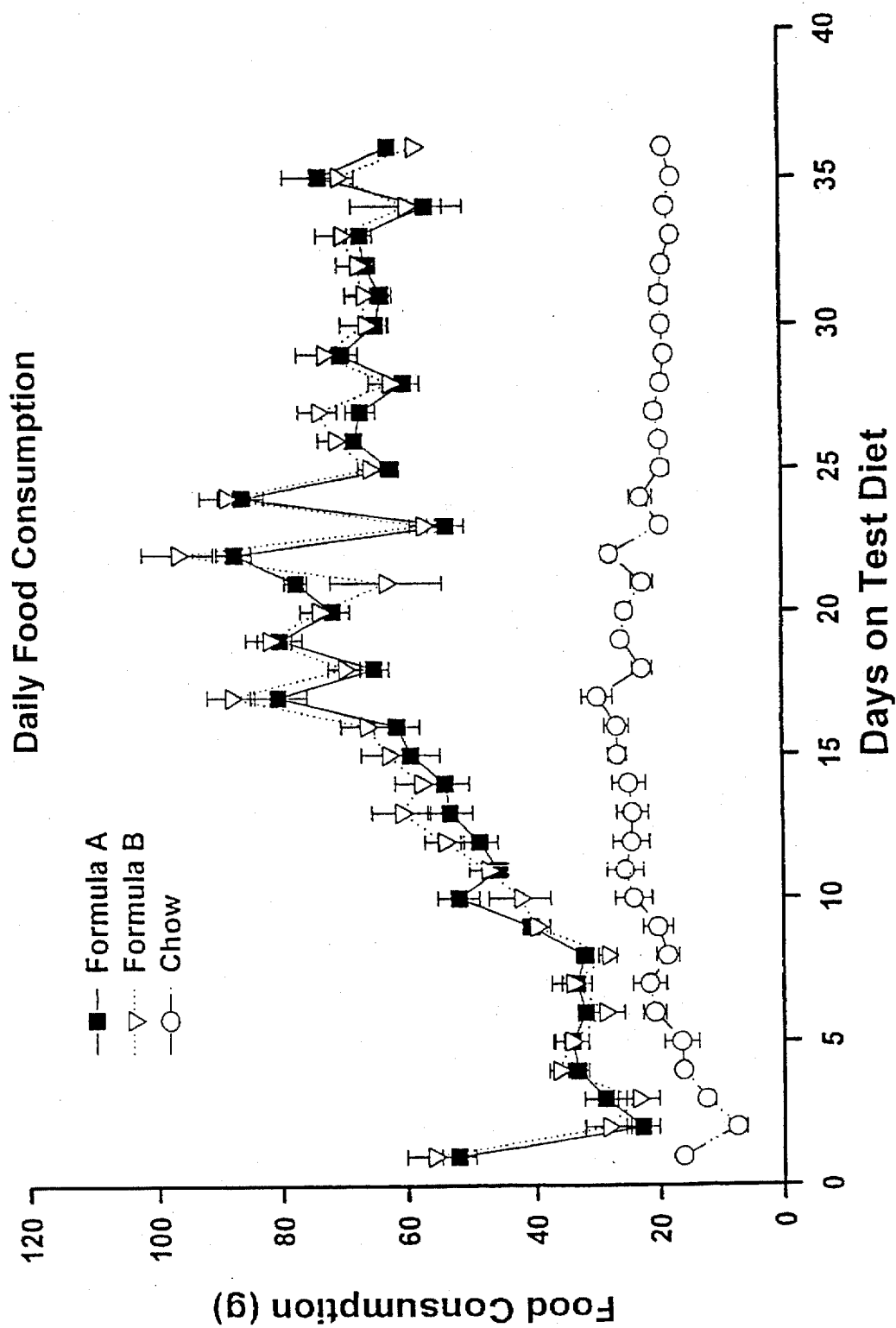
FIG. 1 illustrates the daily food consumption in grams (g) versus the days the rats were on the test diet for each of the three diet groups.

Inflammation of the intestine impairs physiological and immunological functions. Intestinal functions return to normal once inflammation subsides. However, facilitating the repair or healing of such inflammation as well as the maintenance of the gut once inflammation subsides would be advantageous.

The inventors of the present invention believe that the use of an enteral diet will promote the recovery process following inflammation. Specifically, the inventors believe that the use of a composition containing protein, carbohydrate, fat and a source of vitamins and minerals will be effective in reducing or controlling immunoglobulin concentrations. Further and probably as a result of reduced or controlled immunoglobulin concentrations, the inflammatory response of the intestine to the inflammatory agent is also reduced. This will minimize the unpleasant and dangerous symptoms associated with an excessive inflammatory response. As a result, the present invention can be effective in promoting the healing of gastrointestinal injury as well as supporting and maintaining gut functions.

Pursuant to the present invention, the protein source includes approximately 10% to 30% of the total calories of the composition. In a preferred embodiment, proteins provide approximately 16% of the caloric content of the composition. The protein source may include either hydrolyzed or intact protein. In addition, the protein source may be either whey, soy, casein or mixtures thereof.

Carbohydrates provide approximately 25% to about 60% of the total calories of the composition. In a preferred embodiment, carbohydrates provide approximately 51% of the caloric content. A number of carbohydrates can be used pursuant to the present invention including, among others, maltodextrin, corn starch and sucrose.

The lipid content is approximately 15% to 45% of the caloric content of the composition. In a preferred embodiment, the lipid content comprises approximately 33% of the total caloric content of the composition.

Preferably, the lipid source includes a source of medium chain triglycerides and a source of long chain triglycerides. In an embodiment, the lipid source has a medium chain triglyceride:long chain triglyceride ratio of 1:4 to 4:1. While a variety of combinations may be utilized pursuant to the present invention, preferably, approximately 20% to about 70% of the lipid source consists of medium-chain triglycerides. In a preferred embodiment, the medium-chain triglycerides make up approximately 70% of the lipid source. In an embodiment, the medium-chain triglyceride source is fractionated coconut oil.

In addition, the present invention preferably includes a specialized vitamin and mineral profile. The composition includes a source of vitamins and minerals including approximately 75% to about 250% of the recommended daily allowance per 1500 Kcal of the composition administered. In an embodiment, ultra-trace minerals as well as carnitine and taurine are included in the composition.

The composition of the present invention can be administered either enterally or parenterally. In a preferred embodiment, the composition of the present invention is a ready-to-use enteral formulation. In such an embodiment, the composition can be tube-fed to a patient, or fed by having the patient drink same. Preferably, the caloric density of the composition is 1.0 Kcal per ml.

The composition of the present invention can be used for selectively reducing certain immunoglobulin concentrations in a patient suffering from gastrointestinal inflammation. Alternatively, the composition can be used for selectively controlling immunoglobulin concentrations in a patient.

Additionally, the composition of the present invention can be utilized to maintain physiological functions of the intestine in a patient. The method includes a step of administering the composition of the present invention to the patient being treated.

Of course, it will be appreciated that a variety of formulations are possible in accordance with the present invention. By way of example, and not limitation, an example of a suitable composition that may be used pursuant to the present invention is as follows:

Exemplary Composition

A suitable composition that may be utilized pursuant to the present invention is sold under the trademark PEPTAMEN® and can be obtained from Clintec Nutrition Company. PEPTAMEN® is a complete, liquid, ready-to-use, isotonic, peptide-based elemental diet. The PEPTAMEN® elemental diet has a low osmolarity (270 mOsm/kg water) allowing feeding to be initiated at full strength.

PEPTAMEN® includes the following ingredients: water; maltodextrin; hydrolyzed whey protein; medium-chain triglycerides (MCT source: fractionated coconut oil); corn starch; sunflower oil; soy lecithin; potassium citrate; sodium phosphate; magnesium chloride; guar gum; calcium phosphate; choline chloride; sodium ascorbate (vit. C); calcium citrate; magnesium oxide; taurine; L-carnitine; citric acid; zinc sulfate; ferrous sulfate; niacinamide (A B-vit); DL-alpha tocopheryl acetate (vit. E); retinyl palmitate (vit. A); calcium pantothenate (A B- vit ); manganese sulfate; pyridoxine hydrochloride (vit. $B_6$) , cholecalciferol (vit. $D_3$); copper sulfate; riboflavin (vit. $B_2$)l thiamine mononitrate (vit. $B_1$); folic acid; biotin; potassium iodide; sodium molybdate; phylloquinone (vit. $K_1$); sodium selanate; chromium chloride; and cyanocobalamin (vit. $B_{12}$).

PEPTAMEN® has the following nutrient composition (based on 8.45 Fl oz (250 ml)):

| Nutrient Composition | Amount | % U.S. RDA* |
|---|---|---|
| Protein | 10 g | ** |
| Carbohydrate | 31.8 g | 22 |
| Fat*** | 9.8 g | ** |
| Water | 220 ml | ** |
| Vitamin A | 1000 I.U. | 20 |
| Vitamin D | 70 I.U. | 18 |
| Vitamin E | 7 I.U. | 23 |
| Vitamin K | 20 mcg | ** |
| Vitamin C | 35 mg | 58 |
| Thiamine ($B_1$) | .5 mg | 33 |
| Riboflavin ($B_2$) | .6 mg | 35 |
| Niacin | 7 mg | 35 |
| Vitamin $B_6$ | 1 mg | 50 |
| Folic Acid | 135 mcg | 34 |
| Pantoth Acid | 3.5 mg | 35 |
| Vitamin $B_{12}$ | 2 mcg | 33 |
| Biotin | 100 mcg | 33 |
| Choline | 112 mg | ** |
| Taurine | 20 mg | ** |
| L-Carnitine | 20 mg | ** |
| Calcium | 200 mg | 20 |
| Phosphorus | 175 mg | 18 |
| Magnesium | 100 mg | 25 |
| Zinc | 3.5 mg | 23 |
| Iron | 3 mg | 17 |
| Copper | .35 mg | 18 |
| Manganese | .68 mg | ** |
| Iodine | 25 mcg | 17 |
| Sodium | 125 mg | ** |
| Potassium | 313 mg | ** |
| Chloride | 250 mg | ** |
| Chromium | 10 mcg | ** |
| Molybdenum | 30 mcg | ** |
| Selenium | 10 mcg | ** |

*% U.S. RDA Recommended daily allowance for adults & children 4 or more years of age
**U.S. RDA not established
***MCT Provides 6.75 grams/250 ml By way of example, and not limitation, experimental results illustrating the use of the present invention to reduce or control immunoglobulin concentrations as well as maintain physiological functions will now be set forth below.

Experimental Results

This experiment was conducted to evaluate the effect of two diets (PEPTAMEN® and rat chow) on rats subjected to an intestinal injury. The intestines of the rats were traumatized by infection with the enteric parasite, *Trichinella spiralis*. Immediately following such infection, the rats were randomly divided into three groups. Two groups received a PEPTAMEN® diet (two different lots of Peptamen®) and one group received a standard rat chow diet.

Twenty six rats, 100 to 125 g in body weight, were inoculated orally with 3000 *Trichinella spiralis* larvae and were housed individually. Ten rats were placed on the first lot of a PEPTAMEN® diet (hereinafter "Formula A") and ten rats were placed on the second lot of a PEPTAMEN® diet (hereinafter "Formula B"). The remaining six rats were placed on a rat chow diet. The diets were initiated on the day of infection. The rats were fed ad libitum.

Figure 2:
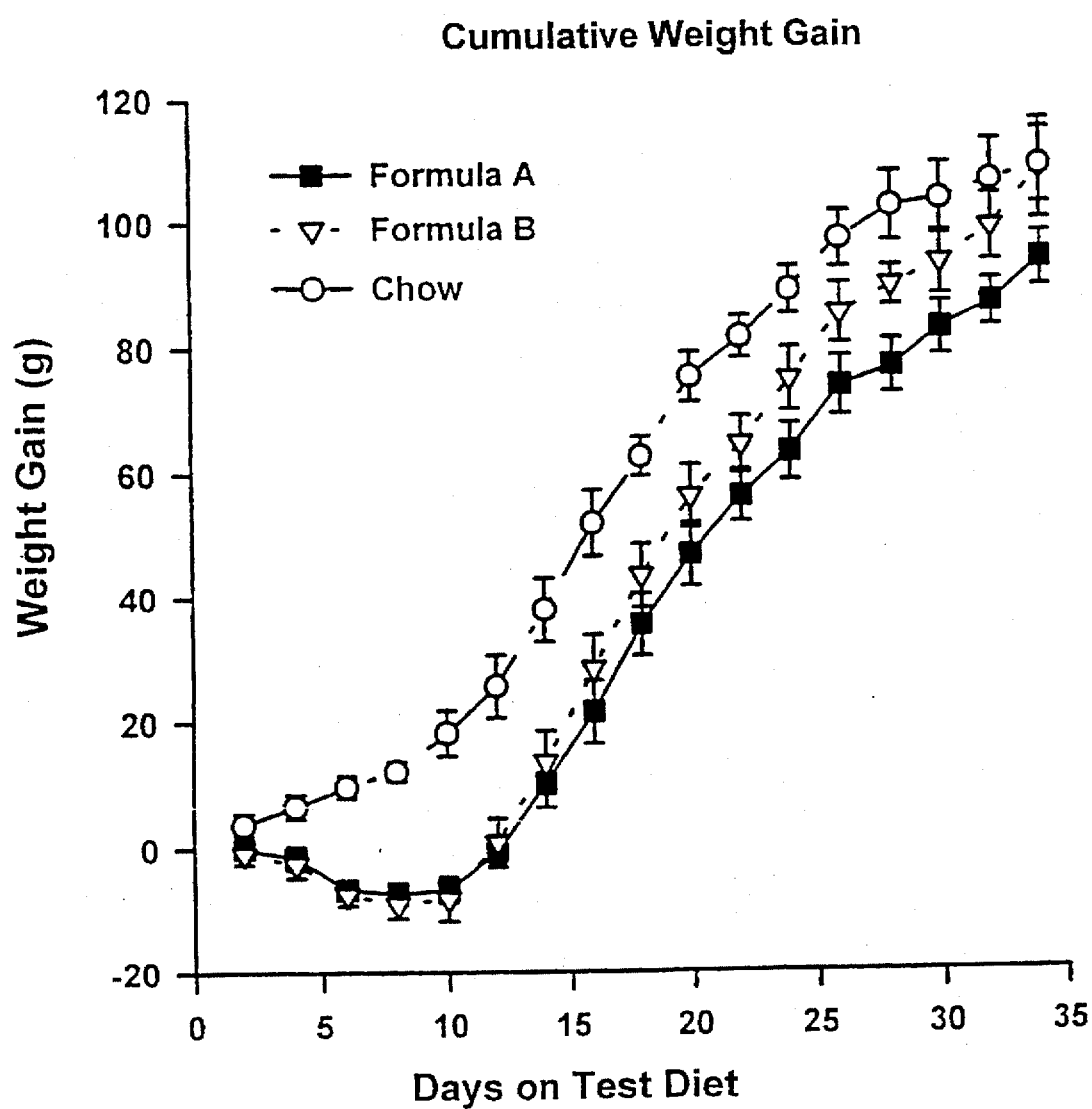
FIG. 2 illustrates the weight gain in grams (g) versus the days the rats were on the test diet for each of the three diet groups.

The rats intake and weight were measured throughout the testing period. Total food consumption was recorded daily. Table 1 below sets forth the recorded daily food consumption in grams over the test period. FIG. 1 graphically illustrates the daily food consumption (g) for all the rats on the two diets (PEPTAMEN® and rat chow). Weight gain was recorded every other day and on the day of sacrifice. Table 2 sets forth the cumulative daily weight gain in grams. Likewise, FIG. 2 graphically illustrates the cumulative weight gain in grams for all the rats on the two diets (PEPTAMEN® and rat chow).

TABLE 1

Daily Food Consumption

| | Diet[a] | | |
|---|---|---|---|
| Days on Diet | Formula A | Formula B | Chow |
| 1 | 52.1 ± 2.6 (10) | 56.0 ± 42 (10) | 16.2 ± 0.6 (6) |
| 2 | 22.8 ± 2.7 (10) | 28.5 ± 3.7 (10) | 7.4 ± 1.5 (6) |
| 3 | 28.9 ± 3.4 (10) | 23.6 ± 3.4 (10) | 12.4 ± 1.0 (6) |
| 4 | 33.1 ± 1.7 (10) | 36.4 ± 1.5 (10) | 16.2 ± 0.8 (6) |
| 5 | 34.3 ± 2.6 (10) | 34.4 ± 2.8 (10) | 16.5 ± 2.8 (6) |
| 6 | 32.1 ± 0.8 (10) | 29.0 ± 3.2 (10) | 20.8 ± 1.9 (6) |
| 7 | 33.5 ± 2.3 (10) | 34.2 ± 3.2 (10) | 21.6 ± 2.7 (6) |
| 8 | 32.2 ± 1.5 (10) | 28.5 ± 1.5 (10) | 18.7 ± 1.9 (6) |
| 9 | 40.7 ± 1.1 (10) | 39.9 ± 2.2 (10) | 20.2 ± 2.4 (6) |
| 10 | 51.9 ± 3.2 (10) | 42.4 ± 4.9 (10) | 24.1 ± 3.0 (6) |
| 11 | 45.8 ± 1.6 (10) | 47.5 ± 2.7 (10) | 25.5 ± 3.0 (6) |
| 12 | 48.7 ± 2.9 (10) | 54.1 ± 3.0 (10) | 24.5 ± 3.0 (6) |
| 13 | 53.2 ± 3.4 (10) | 60.8 ± 4.6 (10) | 24.3 ± 2.6 (6) |
| 14 | 54.0 ± 3.8 (10) | 57.7 ± 4.0 (10) | 24.9 ± 2.7 (6) |
| 15 | 59.2 ± 4.5 (10) | 62.3 ± 4.3 (10) | 26.8 ± 1.5 (6) |
| 16 | 61.4 ± 3.6 (10) | 66.3 ± 4.0 (10) | 26.9 ± 2.0 (6) |
| 17 | 80.4 ± 4.6 (10) | 88.1 ± 3.8 (10) | 30.0 ± 2.5 (6) |
| 18 | 64.9 ± 2.3 (10) | 69.7 ± 2.6 (10) | 22.6 ± 1.6 (6) |
| 19 | 80.1 ± 3.7 (10) | 81.9 ± 3.7 (10) | 26.1 ± 0.9 (6) |
| 20 | 71.6 ± 2.8 (10) | 73.3 ± 2.9 (10) | 25.4 ± 1.2 (6) |
| 21 | 77.5 ± 1.8 (10) | 63.1 ± 8.8 (10) | 22.5 ± 1.8 (6) |
| 22* | 87.5 ± 2.8 (10) | 95.6 ± 5.7 (10) | 27.9 ± 1.3 (6) |
| 23** | 53.6 ± 2.8 (10) | 57.2 ± 2.0 (10) | 19.6 ± 0.6 (6) |
| 24* | 86.3 ± 3.7 (10) | 88.8 ± 4.1 (10) | 22.7 ± 1.9 (6) |
| 25** | 62.1 ± 1.4 (10) | 66.5 ± 1.8 (10) | 19.3 ± 1.2 (6) |
| 26 | 67.9 ± 1.3 (10) | 71.0 ± 2.7 (10) | 19.6 ± 0.8 (6) |
| 27 | 66.8 ± 2.4 (10) | 73.7 ± 3.2 (10) | 20.4 ± 1.3 (6) |
| 28 | 60.0 ± 2.5 (10) | 62.2 ± 3.2 (10) | 19.3 ± 1.9 (6) |
| 29 | 70.0 ± 2.9 (10) | 72.7 ± 4.3 (10) | 18.7 ± 0.7 (6) |
| 30 | 64.3 ± 1.8 (10) | 66.0 ± 3.9 (10) | 19.1 ± 1.1 (6) |
| 31 | 63.4 ± 1.7 (10) | 66.4 ± 2.8 (10) | 19.3 ± 1.4 (6) |
| 32 | 66.1 ± 1.6 (10) | 67.4 ± 3.1 (10) | 19.0 ± 1.1 (6) |
| 33 | 66.8 ± 2.0 (7) | 69.9 ± 4.0 (7) | 17.6 ± 0.7 (6) |

TABLE 1-continued

Daily Food Consumption

| | Diet[a] | | |
|---|---|---|---|
| Days on Diet | Formula A | Formula B | Chow |
| 34 | 56.5 ± 2.7 (7) | 59.5 ± 8.7 (7) | 18.4 ± 0.5 (6) |
| 35 | 73.4 ± 5.7 (4) | 70.3 ± 2.7 (4) | 17.4 ± 0.4 (5) |
| 36 | 62.3 (1) | 58.3 (1) | 18.8 ± 0.9 (4) |

[a]Values are means ± S.E. (n)
*Consumed from morning to following afternoon.
**From afternoon to following morning.

TABLE 2

Cumulative Weight Gain (g)

| | Diet[a] | | |
|---|---|---|---|
| Days on Diet | Formula A | Formula B | Chow |
| 2 | −0.1 ± 1.3 (10) | −0.9 ± 1.7 (10) | 3.8 ± 1.7 (6) |
| 4 | −1.6 ± 1.9 (10) | −2.5 ± 2.2 (10) | 6.7 ± 1.9 (6) |
| 6 | −6.6 ± 1.5 (10) | −7.4 ± 1.8 (10) | 9.8 ± 1.8 (6) |
| 8 | −7.3 ± 1.7 (10) | −9.0 ± 2.2 (10) | 12.2 ± 1.5 (6) |
| 10 | −6.7 ± 2.0 (10) | −8.2 ± 3.5 (10) | 18.2 ± 3.6 (6) |
| 12 | −0.7 ± 2.5 (10) | 0.9 ± 3.8 (10) | 25.7 ± 5.0 (6) |
| 14 | 10.3 ± 3.8 (10) | 13.6 ± 4.9 (10) | 38.0 ± 5.2 (6) |
| 16 | 21.5 ± 5.1 (10) | 28.4 ± 5.4 (10) | 52.0 ± 5.3 (6) |
| 18 | 35.5 ± 5.1 (10) | 43.5 ± 5.2 (10) | 62.7 ± 3.1 (6) |
| 20 | 46.9 ± 5.2 (10) | 56.3 ± 5.0 (10) | 24.1 ± 3.0 (6) |
| 22 | 56.3 ± 4.1 (10) | 64.5 ± 4.5 (10) | 81.6 ± 3.3 (6) |
| 24 | 63.3 ± 4.6 (10) | 74.9 ± 5.0 (10) | 88.9 ± 3.8 (6) |
| 26 | 73.8 ± 4.7 (10) | 85.3 ± 4.7 (10) | 97.2 ± 4.6 (6) |
| 28 | 76.9 ± 4.2 (10) | 89.7 ± 3.2 (10) | 102.5 ± 5.7 (6) |
| 30 | 82.9 ± 4.1 (10) | 93.4 ± 5.2 (10) | 103.7 ± 5.8 (6) |
| 32 | 86.9 ± 3.7 (10) | 99.0 ± 5.4 (10) | 106.7 ± 6.6 (6) |
| 34 | 93.9 ± 4.4 (7) | 108.4 ± 8.1 (7) | 109.0 ± 6.1 (6) |

*Values are means ± S.E. (n)

After the feeding period, the rats were sacrificed and a variety of testing was completed on the intestines of the rats. Immune responsiveness was assessed by measuring type I hypersensitivity, as reflected in antigen-induced chloride secretion. Jejunal segments were challenged in vitro in Ussing-type chambers with *T. spiralis* antigen. In this preparation, net chloride secretion is measured electrophysiologically as a change in transmural short circuit current. The short circuit current changes are due to the net serosal-to-mucosal movement of the chloride ions.

Gut segments were mounted in Ussing chambers and glucose absorption as well as responses of chloride secretion to serotonin (5-HT) and carbachol (CCh) were measured. Serum was also collected and titers for anti-*Trichinella* IgE, IgG, IgM and IgA were determined. Anti-*Trichinella* levels of IgG, IgM and IgA were determined by enzyme-linked immunosorbent assay (ELISA). Anti-*Trichinella* IgE levels were measured using a passive cutaneous anaphylaxis test.

The results from the various tests conducted are set forth in Tables 3–6. Table 3 sets forth the tested basal electrophysiological parameters in the jejunum. Tables 4 sets forth the results of the antigen-induced changes in short circuit current ($\Delta I_{sc}$) in the jejunum. Table 5 sets forth the measured anti-*Trichinella* IgG, IgM and IgA levels in the collected serum. Likewise, Table sets forth the anti-*Trichinella* IgE levels in the collected serum.

TABLE 3

Basal Electrophysiological Parameters in Jejunum

| Diet | $R(\Omega \cdot cm^2)$ | $I_{sc}(\mu A/cm^2)$ | PD(mV) |
|---|---|---|---|
| Formula A | 30.1 ± 1.3 (10) | 42.6 ± 6.1 (10) | 1.24 ± 0.16 (10) |
| Formula B | 30.5 ± 1.5 (10) | 38.66.4 (10) | 1.08 ± 0.11 (10) |
| Chow | 30.7 ± 1.5 (6) | 36.9 ± 3.1 (6) | 1.09 ± 0.9 (6) |

Parameters[a]
[a]Values are mean ± S.E. (n)

TABLE 4

Antigen-Induced Changes in Short Circuit Current ($\Delta I_{sc}$) in Jeunum

| Diet | Phase I[b] | Phase II[b] |
|---|---|---|
| Formula A | 22.7 ± 5.5 (10) | 43.4 ± 7.0 (10) |
| Formula B | 23.3 ± 5.1 (10) | 32.6 ± 5.3 (10) |
| Chow | 40.1 ± 7.4 (6) | 75.3 ± 19.0 (6) |

$\Delta I_{sc}(\mu A/cm^2)$[a]

[a]Values are mean ± S.E. (n)
[b]Trichinella antigen was added to serosal side (25 μg/ml).
*Statistically significant difference (p < .05)

TABLE 5

Serum Anti-Trichinella Antibodies

| | IgG | | IgM | | IgA | |
|---|---|---|---|---|---|---|
| | 80K | 160K | 10K | 20K | 10K | 20K |
| | | | $O.D._{(490 nm)}$ | | | |
| Formula A[b] | .437 ± .024[a] | .245 ± .020 | .338 ± .039* | .145 ± .013* | 1.002 ± .050 | .353 ± .021 |
| Formula B[b] | .378 ± .032 | .224 ± .016 | .396 ± .074* | .157 ± .022* | 0.997 ± .042 | .338 ± .023 |
| Chow[c] | .483 ± .053 | .263 ± .024 | .921 ± .211 | .406 ± .124 | 1.133 ± .093 | .349 ± .036 |

Antibody Dilution

[a]Values are mean ± S.E.
[b]n = 10
[c]c = 6
*Statistically Significant Difference (p < .05)

TABLE 6

Serum Anti-Trichinella IgE

| Diet | Anti-trichinella IgE serum diltuion[a] |
|---|---|
| Formula A | 64.0 ± 14.9 (10) |
| Formula B | 44.0 ± 11.6 (10) |
| Chow | 117.3 ± 10.7* (6) |

[a]Values are mean ± S.E. (n)
*Statistically Significant Difference (p < .05)

The inventors have discovered that a clinical liquid diet, such as the PEPTAMEN® diet, was effective in maintaining absorptive, secretory and digestive functions as well as body weight in normal rats. In rats whose intestines were traumatized by infection with a parasite, a difference in the production of antibodies against parasite antigens between rats feed the liquid PEPTAMEN® diet and the solid rat chow diet was noted. This was observed in rats tested 32 to 36 days after infection, with the PEPTAMEN® diet being initiated on the day of infection. Unexectedly, the inventors discovered, with the present experiment, that serum IgE and levels specific for the parasite antigen were significantly reduced in rats feed the PEPTAMEN® liquid diet.

To determine the potential physiological significance of the reduced IgE, the capacity of the rats on the two diets to express intestinal IgE-mediated type hypersensitivity, using anaphylaxis-mediated, antigen-induced Cl secretion as an endpoint, was tested. Phases I and II of the diphasic secretion of Cl were lower in rats maintained on the Peptamen® liquid diet (see Table 4). This result shows that the response to the inflammatory stimulus was dampened in the rats receiving the PEPTAMEN® diet. These data therefore illustrate a direct correlation between reduced IgE and its physiological effects which is thus assumed to be causal. Also, rats in both diet groups showed the same rate of weight gain after day twelve of infection. These results demonstrate that the PEPTAMEN® liquid diet was comparable to the rat chow diet in its capacity to maintain most physiological functions.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for reducing antigen-specific IgE or IgM concentrations in a patient suffering from a gastrointestinal disorder comprising the step of administering to the patient a therapeutically effective amount of a composition comprising:

a protein source comprising approximately 10% to 30% of the total calories;

a carbohydrate source comprising approximately 25% to 60% of the total calories; and a lipid source comprising approximately 15% to 45% of the total calories wherein the lipid source comprises both a medium chain triglyceride and a long chain triglyceride.

2. The method of claim 1 wherein the lipid source comprises a medium-chain triglyceride to long chain triglyceride ratio of approximately 1:4 to 4:1.

3. The method of claim 1 wherein the lipid source comprises approximately 20% to 80% medium chain triglycerides.

4. The method of claim 1 wherein the carbohydrate source is selected from the group consisting of: maltodextrin; corn starch; sucrose and mixtures thereof.

5. The method of claim 2 wherein the long chain triglycerides are selected from the group consisting of: corn oil; safflower oil; sunflower oil; canola oil; and marine oil.

6. The method of claim 1 wherein the composition further comprises a source of vitamins and minerals.

7. The method of claim 1 wherein the composition is administered enterally.

8. A method for controlling antigen-specific IgE or IgM concentrations in a patient suffering from a gastrointestinal disorder comprising the step of administering to the patient a therapeutically effective amount of a composition comprising:

a protein source comprising approximately 10% to 30% of the total calories;

a carbohydrate source comprising approximately 25% to 60% of the total calories;

a lipid source comprising approximately 15% to 45% of the total calories wherein the lipid source comprises a medium chain triglyceride and a long chain triglyceride; and a source of vitamins and minerals.

9. The method of claim 8 wherein the lipid source comprises a medium-chain triglyceride to long chain triglyceride ratio of approximately 1:4 to 4:1.

10. The method of claim 8 wherein the lipid source comprises approximately 20% to 80% medium chain triglycerides.

11. The method of claim 9 wherein the carbohydrate source is selected from the group consisting of: maltodextrin; corn starch; sucrose and mixtures thereof.

12. The method of claim 8 wherein the long chain triglycerides are selected from the group consisting of: corn oil; safflower oil; sunflower oil; canola oil; and marine oil.

13. The method of claim 8 wherein the source of vitamins and minerals comprise approximately 75% to about 150% of the recommended daily allowance per 1500 Kcal of the composition administered.

14. The method of claim 8 wherein the composition is administered enterally.

15. A method for maintaining nutritional status of a patient while sustaining physiological functions of the intestine and reducing IgE and IgM levels in the patient comprising the step of enterally administering to the patient a therapeutically effective amount of a composition comprising:

a protein source comprising approximately 10% to 30% of the total calories;

a carbohydrate source comprising approximately 25% to 60% of the total calories; and a lipid source comprising approximately 15% to 45% of the total calories.

16. The method of claim 15 wherein the lipid source comprises a medium-chain triglyceride to long chain triglyceride ratio of approximately 1:4 to 4:1.

17. The method of claim 15 wherein the lipid source comprises approximately 20% to 80% medium chain triglycerides.

18. The method of claim 15 wherein the composition further comprises a source of vitamins and minerals.

* * * * *